United States Patent Office 2,761,846
Patented Sept. 4, 1956

2,761,846

SCOTOPHOR AND METHOD OF MAKING SAME

David B. Medved, Philadelphia, Pa., assignor to Philco Corporation, Philadelphia, Pa., a corporation of Pennsylvania No Drawing. Application May 28, 1952,
Serial No. 290,617

6 Claims. (Cl. 252—301.4)

This invention relates to tenebrescent substances or scotophors and more particularly to a method of manufacturing a tenebrescent substance resembling natural sodalite.

Tenebrescent substances are substances which may be made to darken visibly and bleach reversibly under suitable irradiations. The alkali halides can be darkened by suitable electron bombardment or by exposure to X-rays or very short wavelength ultraviolet rays. Exposure to ambient light results in bleaching or fading of the darkened crystals. Natural sodalite, a sodium-aluminum silicate of the form $Na_6Al_6O_{24} \cdot 2NaCl$ with a cubic lattice structure, occurs in nature as a crystal having a definite blue coloration. Natural sodalite may be bleached to a colorless state by heating to 450° C. The original blue coloration may be restored by exposing the bleached sodalite to X-rays.

An activated form of this mineral, known as pink sodalite or hackmanite, darkens to a magenta color upon exposure to ultraviolet light at 2537 A. or 3600 A. and bleaches to a colorless crystal upon exposure to visible light. Natural hackmanite may also be bleached after exposure to ultraviolet radiation by heating to approximately 250° C. However, once bleached in this manner natural hackmanite loses its sensitivity to ultraviolet radiation. Natural hackmanite may also be darkened to the characteristic blue of sodalite by exposure to X-rays. The mineral thus darkened may be bleached by heating without loss of X-ray sensitivity.

The ability of hackmanite to darken under long wavelength ultraviolet radiation and bleach under visible light makes this mineral particularly useful in systems for storing optical images. For example, hackmanite in a powdered form may be deposited on a transparent or opaque plate or sandwiched between transparent supports to form an image screen. An image may be formed on this screen by scanning the surface with a modulated beam of ultraviolet light. The resulting image may be viewed directly by illuminating the screen with visible light. The visible light will also bleach the screen to a colorless state so that a new image may be formed thereon. The rate at which the image is bleached may be controlled by controlling the intensity of the visible light. Unfortunately, the mineral hackmanite occurs only rarely in nature and no known major deposits of this mineral are to be found in this country. Also, in its natural state the crystals of hackmanite are so intermixed with other minerals as to make it impractical to separate them on a commercial scale.

Therefore, it is an object of the present invention to provide a method of manufacturing a tenebrescent substance resembling natural hackmanite.

It is a further object of the present invention to provide a method of manufacturing a tenebrescent substance resembling natural sodalite in its unactivated state.

It is a further object of the present invention to provide a method of converting natural or synthetic sodalite to a tenebrescent material resembling hackmanite.

Still another object is to provide a tenebrescent substance which will darken under long wavelength ultraviolet radiation and bleach under visible radiation.

Other objects will appear in the following description:

A typical example of the preparation of the tenebrescent substance resembling sodalite is as follows: Stoichiometric proportions of C. P. grade sodium chloride (NaCl), aluminum oxide ($Al_2O_3$), sodium hydroxide (NaOH) and silicon dioxide ($SiO_2$) according to the equation $6NaOH + 3Al_2O_3 + 6SiO_2 + 2NaCl$ are thoroughly and intimately mixed by grinding in a mortar and ball milling. The resulting powder is tightly packed into a covered platinum crucible, immersed in a sand bath ($ZrO_2$) and placed in a cold oven (air atmosphere). The oven is slowly raised to a temperature of 1060° C. and allowed to remain at this temperature for 24 to 72 hours. The temperature of the oven is then allowed to return to room temperature. The resulting compound has, with only minor exceptions, the physical and chemical properties of natural sodalite. Therefore, throughout the specification this substance will be referred to as synthetic sodalite. The heating period is not critical as to duration and the time that the mixture is allowed to remain at a temperature of 1060° C. is governed primarily by the size of crystals to be produced. It has been found that material identifiable as sodalite by its coloration and X-ray diffraction pattern was formed in less than 5 hours at the above temperature.

After a heating period of 24 to 72 hours, the resulting compound consists of crystals of one millimeter in length or less and is granular in appearance. The reaction is carried out below the melting point of sodalite (about 1100° C.). Therefore, crystal growth occurs pyrolytically—that is, through the medium of solid state reactions. If the temperature is permitted to exceed approximately 1100° C., sodalite is not formed. Instead, an opaque glass is obtained giving a diffuse diffraction pattern and a tan coloration under X-ray irradiation.

It was found experimentally that the reaction is improved if a flux is added to the mixture before heating. In particular it was found that a small quantity of sodium carbonate ($Na_2CO_3$) added before grinding and ball milling increased the rate of crystal growth. However, the presence of the sodium carbonate is not essential to the production of artificial sodalite. The procedures mentioned above for mixing and heating the ingredients are exemplary only and other procedures may be substituted therefor without departing from the invention.

In the preparation of one sample the following proportions by weight were employed:

|  | Grams |
|---|---|
| NaCl | 1.10 |
| $Al_2O_3$ | 3.06 |
| NaOH | 2.40 |
| $SiO_2$ | 4.50 |
| $Na_2CO_3$ | 2.10 |

The impurity content as shown by the analyses on the labels was:

|  | Percent |
|---|---|
| $SO_4$ | .005 |
| Ca and Mg | .003 |
| Fe | .002 |
| Pb and Ba | .001 |
| $PO_4$ | .0003 |
| As | .0001 |

Although these impurities were believed to be present in the sodalite sample no deleterious nor activating effects were found due to them.

The activated form of sodalite, known as pink sodalite or hackmanite, is synthesized as follows:

Synthetic sodalite or natural sodalite ground to a powder is placed in a reducing atmosphere and heated to 1050° C. The sodalite is allowed to remain at this temperature for approximately one hour and then rapidly quenched to room temperature. The resulting substance is synthetic hackmanite. This synthetic hackmanite will darken to a magenta color upon exposure to ultraviolet light (2537 A.) and will bleach to a colorless substance upon exposure to visible light.

The reducing atmosphere may be provided by firing the sodalite in a combustion tube through which is passed a stream of hydrogen. Hackmanite prepared in this manner showed a high degree of tenebrescence after only 10 minutes in the reducing atmosphere. Alternatively, the reducing atmosphere may be provided by heating the sodalite in a carbon block. The carbon block may be placed in a zircon sagger to prevent contamination of the sodalite by oven materials. After heating for approximately one hour the entire system may be quenched to room temperature by removing the sagger from the oven and allowing it to cool in air.

The sensitivity of the hackmanite to ultraviolet light is believed to be due to the formation of F centers in the crystal lattice structure during the heating step. The rapid quenching of the activated material insures that a maximum number of F centers will remain after the material has cooled.

It is possible to prepare activated sodalite directly from the original ingredients by causing the final portion of the heating period to be carried out in a reducing atmosphere. However, the unactivated sodalite has a tendency to fuse into a solid mass during the prolonged heating period making it difficult for the reducing atmosphere to penetrate the mass. This difficulty is overcome as suggested above by allowing the unactivated sodalite to cool and then grinding the mass before reheating in the reducing atmosphere. Other methods of accomplishing the same result will suggest themselves to those skilled in this art and, for this reason, the invention is not to be limited by the procedure given above.

It has been found that the addition of 1% cadmium oxide (CdO) to the sodalite causes the activated sodalite to darken more rapidly under 2537 A. ultraviolet light but sodalite activated in this manner cannot be bleached by light alone. However, it can be bleached without loss of sensitivity by heating to 300° C.

The addition of 2.5% yttrium oxide ($Y_2O_3$) and 1.7% calcium carbonate ($CaCO_3$) in the activation step produces a substance which darkens at a higher rate than natural hackmanite or cadmium-activated synthetic hackmanite. The yttrium-calcium activated synthetic hackmanite bleaches at a slower rate than natural hackmanite but can be completely bleached in a matter of minutes by exposure to visible light.

The presence of copper both in natural and synthetic hackmanite apparently acts as a poison since hackmanite containing this element does not show the characteristic darkening upon exposure to ultraviolet light. There is some evidence that the elements titanium, aluminum, nickel, molybdenum and tin may also have a deleterious effect.

The coloring of the tenebrescent material may be changed by substituting other alkali halides for sodium chloride in the mixture. The optimum temperature for synthesis will depend somewhat upon the particular alkali halide selected.

Having described my invention, what I claim is:

1. A scotophor having the basic chemical composition $Na_6Al_6Si_6O_{24} \cdot 2NaCl$ with the cubic lattice structure of sodalite, and containing about 1% of cadmium oxide said substance assuming a magenta tenebrescent darkening visible in ordinary light upon exposure to radiation having a wave length of 2537 A. which darkening is retained after said exposure, is removable by heating to 300° C. and is again obtainable, even after heating to 300° C., upon exposure to radiation having a wave length of 2537 A.

2. The method of converting a natural or synthetic sodalite having the basic chemical composition $$Na_6Al_6Si_6O_{24} \cdot 2NaCl$$

and incapable of reversibly bleaching upon exposure to visible light and darkening upon exposure to radiation having a wave length of 2537 A. to a material which reversibly darkens upon exposure to radiation having a wave length of 2537 A. and bleaches upon exposure to visible light, which comprises heating said sodalite to a temperature of about 1050° C. but below 1100° C. in a reducing atmosphere.

3. The method of claim 2 wherein said sodalite is heated in an atmosphere of hydrogen.

4. The method of claim 2 wherein said sodalite is heated in a carbon crucible.

5. The method of claim 2 wherein said heated material is rapidly quenched to room temperature.

6. The method of claim 2 wherein said sodalite is heated at said temperature for between about 10 minutes and about an hour.

References Cited in the file of this patent

UNITED STATES PATENTS 2,196,082    Roberts _____ Apr. 2, 1940

OTHER REFERENCES

Leverenz: "Luminescence of Solids," 1950, page 48.
Pringsheim: "Fluorescence and Phosphorescence," page 660 (1949).
De Ment: "Fluorochemistry, 1945, page 467.
Mellor: Inorganic and Theoretical Chemistry, vol. 6, 1925, pp. 582, 583.